(12) United States Patent
Pereira et al.

(10) Patent No.: US 8,943,399 B1
(45) Date of Patent: Jan. 27, 2015

(54) SYSTEM AND METHOD FOR MAINTAINING POSITION INFORMATION FOR POSITIONED ELEMENTS IN A DOCUMENT, INVOKING OBJECTS TO LAY OUT THE ELEMENTS, AND DISPLAYING THE DOCUMENT

(75) Inventors: Luiz Pereira, New York, NY (US); Edgard Lindner, New York, NY (US); Kevin Markman, New York, NY (US); Lily Xia, New York, NY (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 13/207,117

(22) Filed: Aug. 10, 2011

Related U.S. Application Data

(60) Provisional application No. 61/454,189, filed on Mar. 18, 2011.

(51) Int. Cl.
  *G06F 17/00* (2006.01)
  *G06F 17/21* (2006.01)

(52) U.S. Cl.
  USPC ........... 715/227; 715/204; 715/234; 715/243; 715/788

(58) Field of Classification Search
  USPC .................................. 715/227, 234
  See application file for complete search history.

(56) References Cited

U.S. PATENT DOCUMENTS

| | | | |
|---|---|---|---|
| 4,889,439 A | 12/1989 | Cook et al. | |
| 5,111,397 A | 5/1992 | Chirokas et al. | |
| 5,381,523 A * | 1/1995 | Hayashi | 715/273 |
| 5,694,609 A | 12/1997 | Murata | |
| 5,895,476 A | 4/1999 | Orr et al. | |
| 6,717,593 B1 | 4/2004 | Jennings | |
| 7,487,448 B2 | 2/2009 | Emerson et al. | |
| 7,836,148 B2 | 11/2010 | Popp et al. | |
| 7,920,894 B2 | 4/2011 | Wyler | |
| 2001/0004256 A1 * | 6/2001 | Iwata et al. | 345/204 |
| 2004/0194028 A1 * | 9/2004 | O'Brien | 715/517 |
| 2005/0034068 A1 * | 2/2005 | Jaeger | 715/517 |
| 2007/0118797 A1 * | 5/2007 | Layzell | 715/517 |
| 2008/0033996 A1 * | 2/2008 | Kesari | 715/238 |
| 2008/0092066 A1 * | 4/2008 | Edlund et al. | 715/760 |
| 2011/0167336 A1 * | 7/2011 | Aitken et al. | 715/239 |

OTHER PUBLICATIONS

Unpublished U.S. Appl. No. 13/206,896, filed Aug. 10, 2011.
Unpublished U.S. Appl. No. 13/207,051, filed Aug. 10, 2011.
Unpublished U.S. Appl. No. 13/207,176, filed Aug. 10, 2011.

(Continued)

*Primary Examiner* — Kavita Padmanabhan
*Assistant Examiner* — Ariel Mercado
(74) *Attorney, Agent, or Firm* — Ropes & Gray LLP

(57) ABSTRACT

A list indicating positions of positioned elements on a page of a document is maintained by a page object associated with the page. First position information indicating a first position of a first positioned element having a position that conflicts with a location of a first element associated with the page is transmitted by the page object to a first element object associated with the first element, the first element object being subordinate to the page object within a hierarchy. The first element object generates first layout data. The list is updated by the page object based on a position of a second positioned element having a position that conflicts with the first element. A second element object associated with a second element associated with the page, and subordinate to the page object within the hierarchy, is invoked by the page object to generate second layout data.

18 Claims, 5 Drawing Sheets

(56) References Cited

OTHER PUBLICATIONS

Hearnden, Wave Editor & Document Renders, A talk by Dave Hearnden at teh Wave Summit captured in video on YouTube Nov. 12, 2010, retrieved from the Internet May 23, 2012: http://youtu.be/EuXApEullzc.

Wang et al, Google Wave Operational Transformation, Jul. 1, 2010, 1-6, retrieved from the Internet Feb. 14, 2012: http://wave-protocol.googlecode.com/hg/whitepapers/operational-transform/operational-transform.html.

Danilatos, Demonstration Doodad, with a few different variations of rendering and interactive behaviour, Dec. 5, 2010, 1-3, retrieved from the Internet May 24, 2012: http://code.google.com/p/wave-protocol/source/browse/src/org/waveprotocol/wave/client/editor/examples/img/MyDoodad.java.

Chitu, Footnotes in GoogleDocs, Oct. 17, 2008, XP055028085, retrieved from the Internet May 24, 2012: http://googlesystem.blogspot.com/2008/10/footnotes-in-google-docs.html; p. 1.

Peels et al., Document Architecture and Text Formatting, ACM Transactions on Office Information Systems, XX, XX, 3 Oct. 1, 1985, 347-369.

Danilatos, Riche Text Editor—Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/thread/73608bf7a13f2385; pp. 1-2.

Nichols et al., High-Latency, Low-Bandwidth Windowing in the Jupiter Collaboration System, UIST '95. 8th Annual Symposium on User Interface Software and Technology. Proceedings of the ACM Symposium on User Interface Software and Technology, Nov. 14-17, 1995, 111-120.

Brouwer et al., MathDox editor, Electronic Proceedings MathUI 2009, 2009, XP55028009, retrieved from the Internet May 23, 2012: http://www.win.tue.nl/hansc/mde.pdf; pp. 1-8.

International Search Report and Written Opinion issued in PCT/US2012/028279 on Jun. 6, 2012.

International Search Report and Written Opinion issued in PCT/US2012/028102 on Jun. 5, 2012.

\* cited by examiner

SYSTEM AND METHOD FOR MAINTAINING POSITION INFORMATION FOR POSITIONED ELEMENTS IN A DOCUMENT, INVOKING OBJECTS TO LAY OUT THE ELEMENTS, AND DISPLAYING THE DOCUMENT

This application claims the benefit of U.S. Provisional Patent Application No. 61/454,189, filed Mar. 18, 2011, which is hereby incorporated by reference herein.

TECHNICAL FIELD

This specification relates generally to systems and methods for processing documents, and more particularly to systems and methods for displaying documents.

BACKGROUND

Online document processing services allow users to create and manipulate documents via the Internet, and store the documents at a remote location. Typically, a user accesses an online document processing service using a web browser operating on a computer or other device. Many existing document management services offer common word processing functions, including text editing, text searching, etc. By storing a document at the remote location, a user can access the document from any location, using a computer or other user device that has access to the Internet.

SUMMARY

In accordance with an embodiment, a list indicating positions of respective positioned elements on a page is created and maintained. First position information generated based on the list and indicating a first position of a first positioned element having a position that potentially conflicts with a location of a first element associated with the page is transmitted to a first object associated with the first element, and the first object is invoked to lay out the first element based on the first position information, to generate first layout data. The first element may be a first paragraph, and the second element may be a second paragraph, for example. The first and second positioned elements may be images or tables, for example. The list is updated based on update information received from the first object, the update information indicating a position of a second positioned element having a position that conflicts with the first element. Second position information generated based on the updated list and including an indication of the position of the second positioned element is transmitted to a second object associated with a second element associated with the page, and the second object is invoked to lay out the second element based on the second position information, to generate second layout data. The page is displayed based on the first layout data and the second layout data.

In one embodiment, a determination is made that the first positioned element has a position that potentially conflicts with the location of the first element based on information indicating that the first positioned element has a position before the location of the first element.

The first object may include a first programming class that includes a first set of properties that define and store the first element, and the second object may include a second programming class that includes a second set of properties that define and store the second element.

These and other advantages of the present disclosure will be apparent to those of ordinary skill in the art by reference to the following Detailed Description and the accompanying drawings.

DETAILED DESCRIPTION

Figure 1:
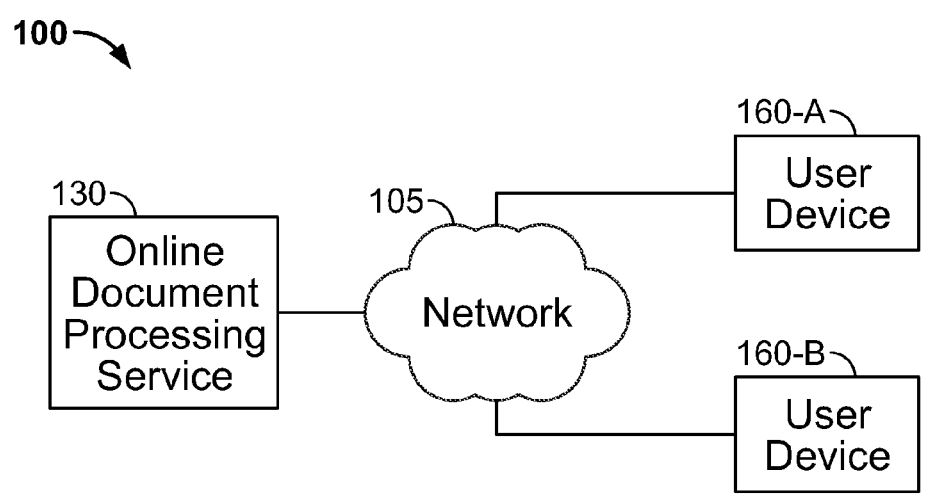
FIG. 1 shows a communication system that may be used to provide document processing services in accordance with an embodiment.

FIG. 1 shows a communication system 100 that may be used to provide document processing services in accordance with an embodiment. Communication system 100 includes a network 105, an online document processing service 130, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Online document processing service 130 provides document processing services to users via network 105, enabling users to create, display, and edit documents remotely. For example, online document processing service 130 may provide online word processing services, allowing users to create, store, and edit text documents and other types of documents. Online document processing service 130 may be accessible via a World Wide Web page that may be viewed using a conventional Web browser, for example. A user may be required to log into a respective user account to access his or her document(s). Online document processing service 130 may offer common word processing features such as text editing, text searching, table creation and editing, etc. Online document processing service 130 may also provide other functions such as image creation and editing, spreadsheet management, etc. Online document processing service 130 may grant to a user access rights with respect to a document, such as viewing and editing rights.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
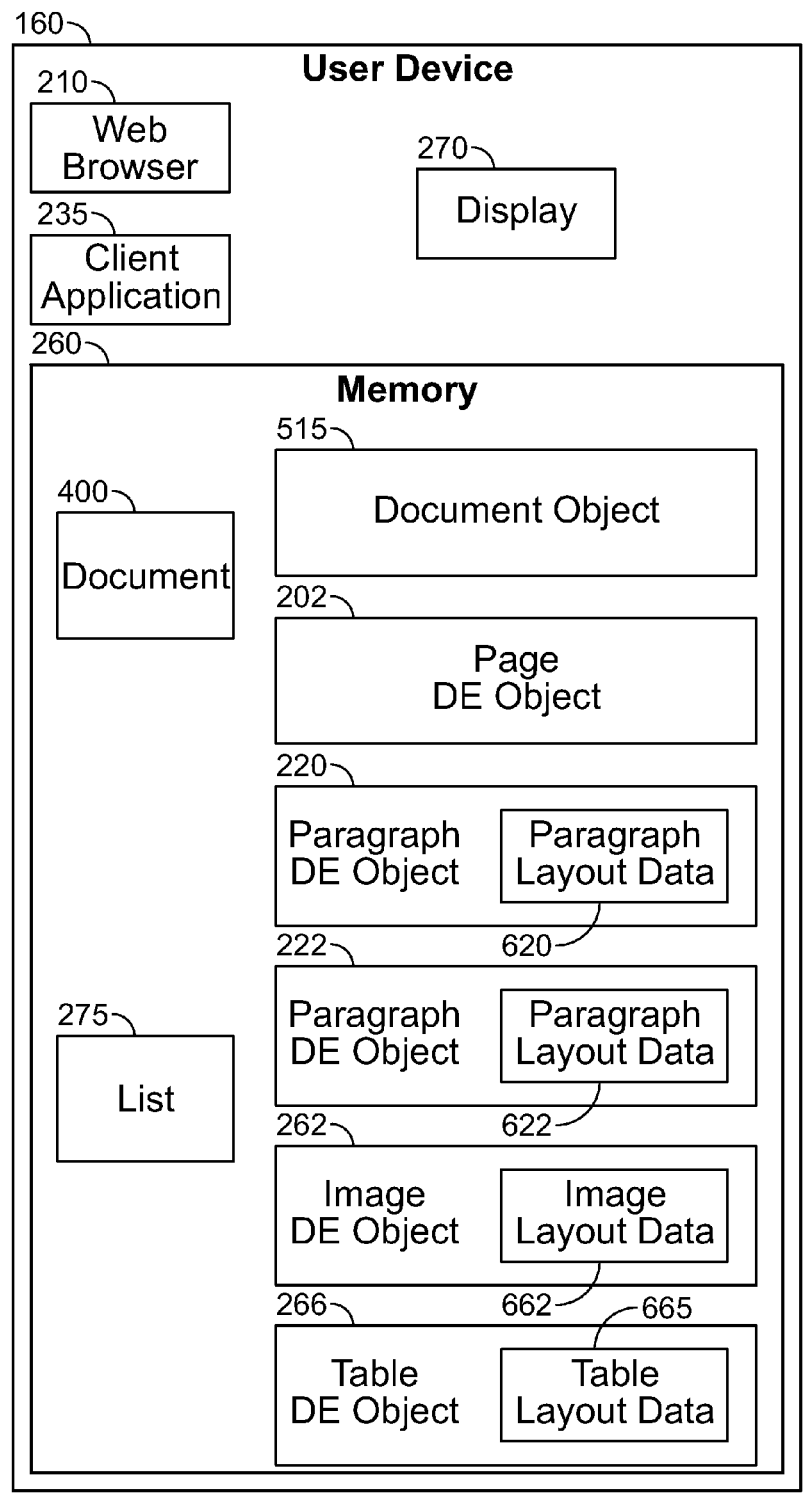
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays documents, images, Web pages, and other information to a user. For example, a text document that a user creates or edits may be displayed on display 270.

User device 160 also includes a client application 235 and a memory 260. Client application 235 may examine a document and generate objects associated with various elements in the document. Memory 260 is used by components of user device 160 to store various types of data, including documents, objects, software code, etc. Examples of documents and objects that may be stored in memory 260 are illustrated in FIG. 2 and described below.

Figure 3:
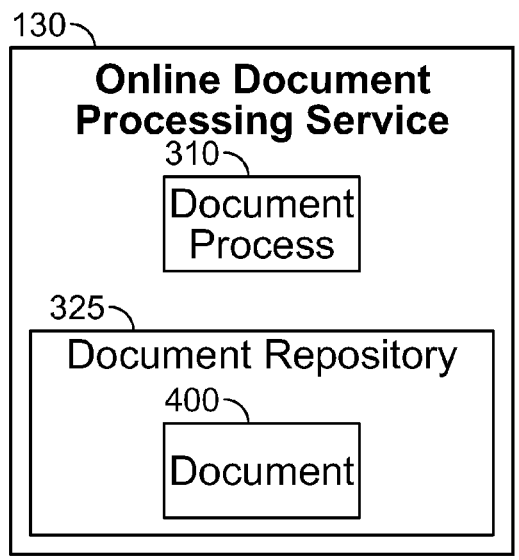
FIG. 3 shows functional components of an online document processing service in accordance with an embodiment.

FIG. 3 shows functional components of online document processing service 130 in accordance with an embodiment. Online document processing service 130 includes a document process 310 and a document repository 325. Document process 310 manages documents and performs operations requested by users, such as creating documents, editing text, performing text searches, etc. Documents created by users are stored in document repository 325. A document created by a user may be stored in association with his or her user account, for example. Multiple versions of a user's document may be stored in document repository 325.

In accordance with the embodiment of FIG. 1, a user may access online document processing service 130 and create and/or edit a document. For example, a user may employ browser 210 to access a World Wide Web site maintained by online document processing service 130. In a well-known manner, the user may be required to log into a user account to access his or her documents. The user may be required to authenticate his or her identity, e.g., by entering a user name and password, before accessing his or her user account and documents associated with the account. Online document processing service 130 may verify the user's access rights with respect to a document before granting the user access to the document.

Figure 4:
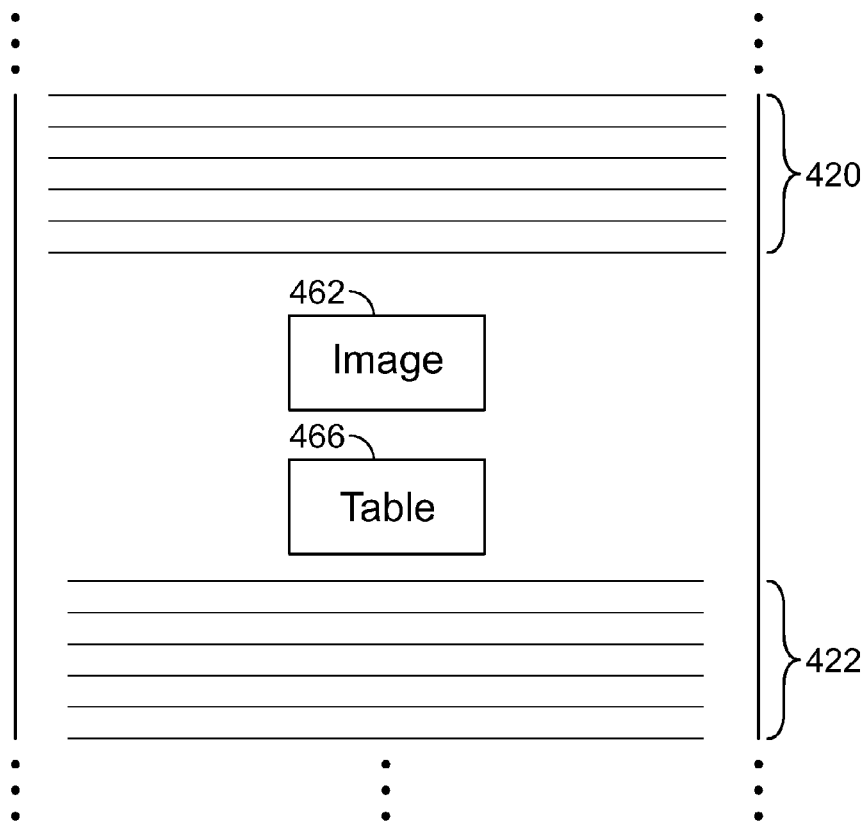
FIG. 4 shows a document in accordance with an embodiment.

Suppose, for example, that a user employs web browser 210 to access online document processing service 130 and creates a new document, such as document 400 illustrated in FIG. 4. In various embodiments, a document may include paragraphs, lines of text, images, tables, headers, footers, footnotes, footnote reference information, pages, and/or other elements. One or more of the elements in a document may be a "positioned element," having a position within the document that is defined relative to the location of another element. In the illustrative embodiment, a positioned element has a position defined relative to an associated paragraph. For example, a positioned element may have a position that is defined relative to the upper left corner of the associated paragraph. In the illustrative embodiment of FIG. 4, document 400 includes text, including paragraphs 420 and 422. Document 400 also includes a first positioned element 462, which is an image having a position defined relative to the location of paragraph 420. Document 400 also includes a second positioned element 466, which is a table that also has a position defined relative to the location of paragraph 420. In the illustrative embodiment, image 462 is defined as having a horizontal offset relative to the upper left corner of paragraph 420 (so that, when displayed, image 462 will appear above and before the text of paragraph 420), and table 466 is defined as having a vertical and horizontal offset relative to the upper left corner of paragraph 420 (so that, when displayed, table 466 will appear below or near the bottom of paragraph 420).

Online document processing service 130 stores document 400, or data representing document 400, in document repository 325, as shown in FIG. 3. Online document processing service 130 may store a document model representing document 400, for example. The user may subsequently employ user device 160, or another device, to access document 400 via the Internet.

A well-known technique used by online document processing services to display a document on a user device includes transmitting data adapted to cause the user device to display all or a portion of the document on a Web page. For example, online document processing service 130 may transmit to browser 210 a request, in the form of HyperText Markup Language (HTML), adapted to cause browser 210 to display a representation of document 400. In response, browser 210 displays a representation of all or a portion of document 400.

Existing online document processing services lay out a selected page of a document in its entirety. If a change is made to the page, the entire page is laid out again in its entirety. This process can be unacceptably slow for users, particularly in a relatively limited development environment such as a web browser or mobile application.

In one embodiment of the invention, user device 160 lays out and renders elements of a document using an architecture based on a hierarchy of objects. As used herein, the term "element" means an element of a document such as a page, a paragraph, a line of text, an image, a table, a header, a footer, a footnote, footnote reference information, a page, etc. An element may be a positioned element, as discussed above. Objects and the hierarchical relationship between various objects are described below. Methods, apparatus, and systems for generating and using objects to lay out and render elements of a document are described in U.S. patent application Ser. No. 13/206,896, filed on Aug. 10, 2011, entitled "System and Method for Displaying a Document," which is hereby incorporated by reference.

An object is a programming class that includes a set of properties that define and store the state of an associated element. For example, an object associated with a particular paragraph may include properties defining the first and last alphanumeric characters of the paragraph. An object also includes functions and methods for manipulating the properties of the object. For example, an object associated with a paragraph may include functions and/or methods for determining whether the paragraph's position collides with a position of another element, finding a cursor location, drawing a new line at the end of the paragraph, etc.

Each object includes a layout function that defines calculations used to display the corresponding element. For example, an object associated with a paragraph includes a layout function for determining where to place each line in the paragraph and whether the paragraph can fit into a given amount of space provided. An object corresponding to a line of text includes a layout function for determining where to place each word in the line. The layout function of an object generates layout data representing the layout of the associated element. For example, an object associated with a paragraph generates layout data indicating which alphanumeric characters are to be placed on which lines of the paragraph. When an object generates layout data, the layout data is stored temporarily within the object itself.

Each object also includes a render function to render the associated element. For example, an object's render function may modify the HyperText Markup Language ("HTML") of a webpage based on layout data associated with a particular element, causing a web browser to render the element. Alternatively, an object's render function may define one or more vectors for displaying an element (as used in the HTML5 Canvas element and other similar tools).

Objects may be organized in a hierarchical relationship. For example, an object responsible for a document as a whole may be a parent object with respect to objects associated with various pages, paragraphs, tables, images, footnotes, footnote reference information, etc., within a document. An object responsible for a page may have child objects responsible for paragraphs associated with the page. An object responsible for a paragraph may have child objects responsible for lines of text within the paragraph. An object responsible for a paragraph may also have a child object responsible for a positioned element such as an image or table that is positioned relative to the paragraph. An object responsible for a table may have child objects responsible for rows within the table, each of which has child objects responsible for cells within the respective rows. An object responsible for a cell may in turn have a child object responsible for another table stored within the cell. A parent object keeps track of its own child objects.

An object responsible for a document as a whole keeps track of the elements within the document, and the relationships and locations of the elements with respect to each other. The object responsible for a document also keeps track of the number of pages in the document, and activates relevant child objects in order to display a particular page of the document on a display device. The object responsible for a document may determine which elements within the document belong on a current page and instruct the corresponding objects to render those elements, for example.

The architecture described above may be used to display a current page of a document. In accordance with an embodiment, one or more elements within a document maintained by an online document processing service are identified, laid out, and rendered on user device 160.

When document 400 is created, for example, or when the user subsequently employs user device 160 to log into his or her account and access document 400, online document processing service 130 transmits data representing the document to user device 160. For example, online document processing service 130 may transmit to user device 160 a data model corresponding to document 400. Online document processing service 130 may alternatively transmit the text of document 400 and associated metadata. Other types of data relating to a document may be provided to user device 160. Client application 235 receives the data defining document 400 stores document 400 in memory 260.

A plurality of elements are identified within document 400. Client application 235 parses the data model representing document 400 to identify the structure of the document and to identify various elements within the document, such as paragraphs, tables, images, footnotes, footnote reference information, etc. In the illustrative embodiment, document 400 itself is identified as an element. In addition, client application 235 identifies a plurality of other elements within the document, including paragraphs 420 and 422, image 462 and table 466 (shown in FIG. 4). In other embodiments, other types of elements may be identified in a document, such as words, lines of text, headers, footers, footnotes, footnote reference information, pages, chapters, etc.

For each of the plurality of elements, a respective object having a first function for laying out the respective element and a second function for rendering the respective element is generated. Thus, client application 235 generates an object corresponding to document 400, referred to herein as a "document object." The document object includes a layout function and a render function for document 400. The document object also includes information defining the relationships between elements in document 400, such as the locations of paragraph 420, paragraph 422, image 462, table 466, etc. Referring to FIG. 2, the document object is stored in memory 260 as document object 515.

Client application 235 also generates an object corresponding to each identified element within document 400. An object corresponding to an element within a document is referred to herein as a "document element object" or "DE object." Thus, referring to FIG. 4, client application 235 generates a DE object that corresponds to paragraph 420 and has a first function for laying out paragraph 420 and a second function for rendering paragraph 420. This DE object is stored in memory 260 as paragraph DE object 220. Client application 235 also generates a DE object that corresponds to paragraph 422 and has a first function for laying out paragraph 422 and a second function for rendering paragraph 422. This DE object is stored in memory 260 as paragraph DE object 222. Client application 235 generates a DE object corresponding to image 462 and has a first function for laying out image 462 and a second function for rendering image 462. This DE object is stored in memory 260 as image DE object 262. Client application 235 generates a DE object corresponding to table 466 and has a first function for laying out table 466 and a second function for rendering table 466. This DE object is stored in memory 260 as table DE object 266.

Client application 235 may generate other DE objects corresponding to other elements within document 400. Client application 235 may generate a DE object for particular lines of text within paragraphs 420 and 422 as well (such DE objects are not shown).

In order to display elements associated with a selected location within document 400, document object 515 identifies one or more elements associated with the selected location. For example, document object 515 may define a page including one or more elements. In the illustrative embodiment, document object 515 determines that paragraphs 420 and 422 are associated with a current page. Accordingly, client application 235 generates a DE object corresponding to the page including paragraphs 420 and 422. This DE object is stored in memory 260 as page DE object 202.

Figure 5:
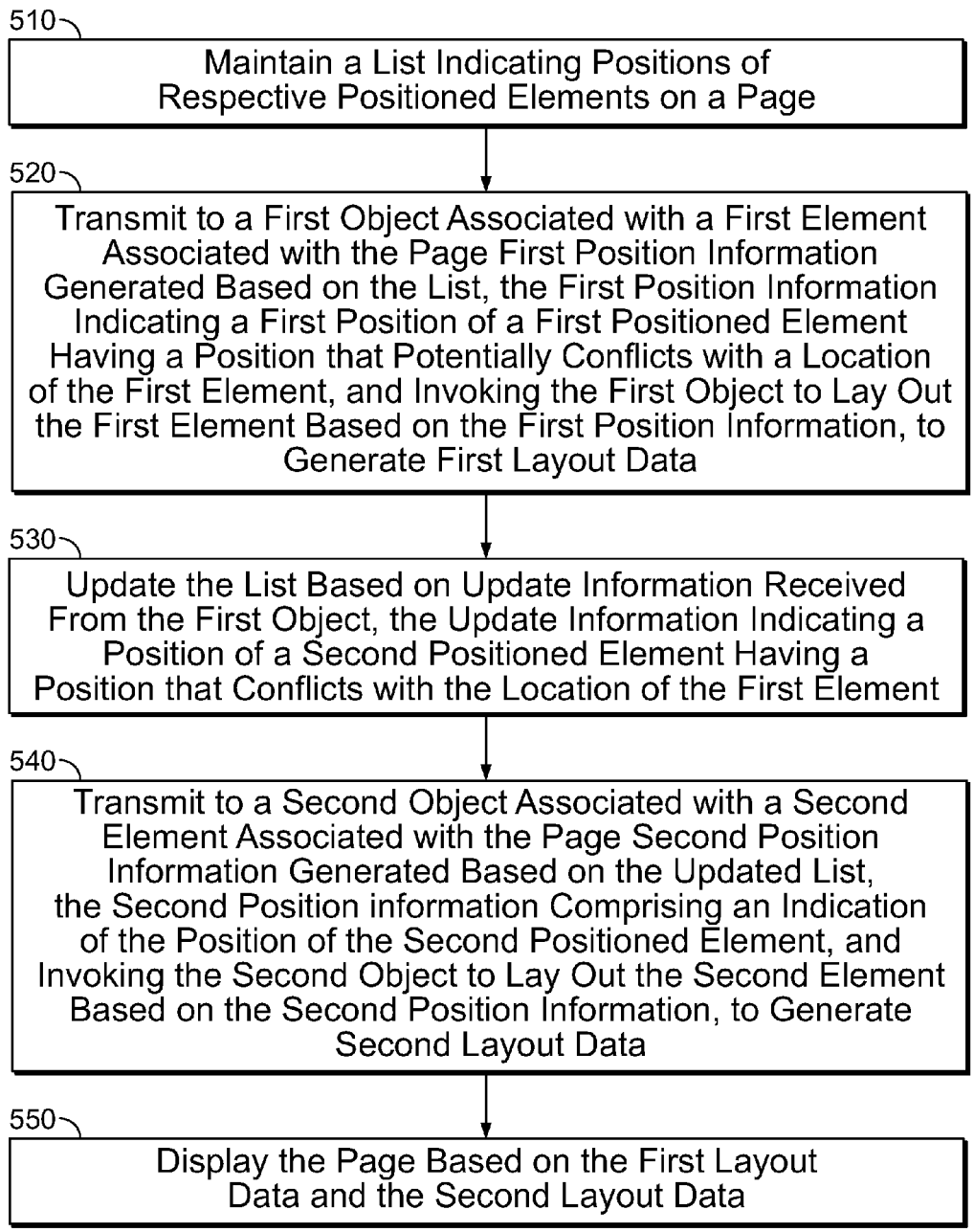
FIG. 5 is a flowchart of a method for providing document processing services in accordance with an embodiment.

In accordance with an embodiment, the object responsible for a page lays out the page by interacting with the objects corresponding to various elements and positioned elements associated with the page. FIG. 5 is a flowchart of a method for laying out and rendering one or more elements associated with a page of a document in accordance with an embodiment.

At step 510, a list indicating positions of respective positioned elements on a page is maintained. In the illustrative embodiment, page DE object 202 creates the list and stores the list in memory 260 as list 275. Referring to FIG. 4, page DE object 202 includes in list 275 information indicating the positions of image 462 and table 466. As described above, image 462 is defined as having a horizontal offset relative to the upper left corner of paragraph 420 (so that, when displayed, image 462 will appear above and before paragraph 420), and table 466 is defined as having a vertical and horizontal offset relative to the upper left corner of paragraph 420 (so that, when displayed, table 466 may appear below or near the bottom of paragraph 420).

Page DE object 202 now proceeds to lay out the elements on the page. Page DE object 202 determines an initial vertical height of each paragraph associated with the page and identifies any "collisions" between elements on the page. For example, the initial vertical height of a paragraph may be calculated by multiplying the number of text lines in the paragraph by a predetermined line height value. Positioned elements that may conflict with the layout of the paragraph may be considered in determining the initial vertical height of a paragraph. In the illustrative embodiment, page DE object 202 determines that image 462 is positioned above and before paragraph 420, and therefore potentially conflicts with the layout of paragraph 420. Page DE object 202 further determines, based on the defined relative position of table 466, that table 466 is positioned below paragraph 420, and that therefore table 466 does not potentially conflict with the layout of paragraph 420.

At step 520, first position information generated based on the list and indicating a first position of a first positioned element having a position that potentially conflicts with a location of a first element associated with the page is transmitted to a first object associated with the first element, and the first object is instructed to lay out the first element based on the first position information, to generate first layout data. Page DE object 202 accordingly transmits to paragraph DE object 220 (responsible for paragraph 420) position information indicating the position of image 462, which potentially conflicts with the layout of paragraph 420. Page DE object 202 also invokes paragraph DE object 220 to lay out paragraph 420.

Figure 6:
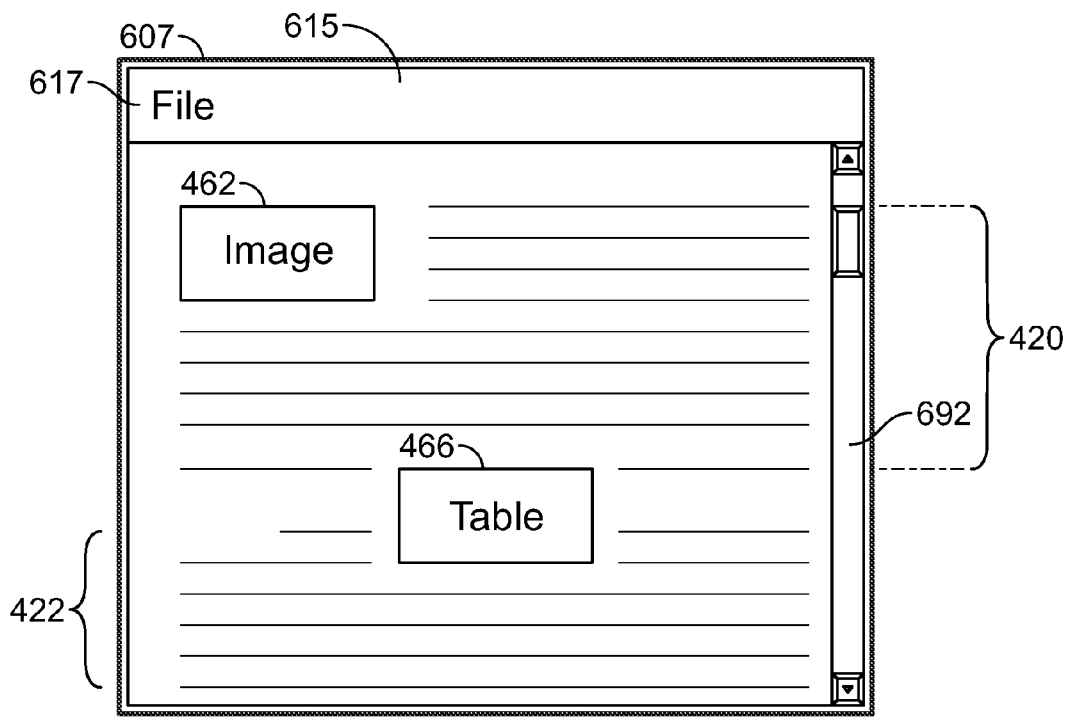
FIG. 6 shows a web page displaying elements of a document in accordance with an embodiment.

In response, paragraph DE object 220 invokes image DE object 262 to lay out image 462. In response, image DE object 262 lays out image 462, generating layout data, which is stored in image DE object 262 as image layout data 662, as shown in FIG. 2. FIG. 6 indicates the relative positions of image 462 and other elements on the page. Paragraph DE object 220 then lays out paragraph 420 based on the layout of image 462, generating layout data, which is stored in paragraph DE object 220 as paragraph layout data 620, as shown in FIG. 2. During the layout of paragraph 420, paragraph DE object 220 lays out the text of the paragraph to fit around image 462 (see FIG. 6). As a result, the text of paragraph 420 extends below image 462 and in particular extends below the initial vertical height calculated for paragraph 420 by page DE object 202. Paragraph DE object 220 determines that the updated position of the text of paragraph 420 collides with the table 466.

Paragraph DE object 220 now invokes table DE object 266 to lay out table 466. In response, table DE object lays out table 466, generating layout data, which is stored in table DE object 266 as table layout data 665. In some embodiments, after being laid out, the position of a positioned element such as table 466 may be different from the initial position determined by page DE object 202 due to the layout of the associated paragraph.

Paragraph DE object 220 now transmits to page DE object 202 update information indicating the updated position of the text of paragraph 420. In addition, because the text of paragraph 420 collided with table 466, paragraph DE object 220 also provides to page DE object 202 position information indicating the position of table 466.

At step 530, the list is updated based on update information received from the first object, the update information indicating a position of a second positioned element having a position that conflicts with the first element. Page DE object updates list 275 based on the information received from paragraph DE object 220 to indicate that the position of table 466.

Page DE object 202 now proceeds to the layout of paragraph 422. At step 540, second position information generated based on the updated list and including an indication of the position of the second positioned element is transmitted to a second object associated with a second element associated with the page, and the second object is invoked to lay out the second element based on the second position information, to generate second layout data. Page DE object 202 transmits to paragraph DE object 222 (responsible for paragraph 422) information indicating the positions of positioned elements that potentially conflict with the position of paragraph 422. In the illustrative embodiment, page DE object 202 examines list 275 and determines that image 462 and table 466 are both positioned above paragraph 422. Accordingly, page DE object 202 transmits to paragraph DE object 222 information indicating the positions of image 462 and table 466. Page DE object 202 also invokes paragraph DE object 222 to lay out paragraph 422.

In response, paragraph DE object 222 lays out paragraph 422 based on the position information received from page DE object 202. In the illustrative embodiment, paragraph DE object 222 lays out paragraph 422 to fit around table 466, generating layout data, which is stored in paragraph DE object 222 as paragraph layout data 622. Paragraph DE object 222 determines that image 462 does not conflict with the position of paragraph 422. Paragraph DE object 222 transmits to page DE object 202 information indicating the positions of any additional positioned elements that conflict with the position of paragraph 422. In the illustrative embodiment, no additional positioned elements conflict with the layout of paragraph 422.

At step 550, the page is displayed based on the first layout data and the second layout data. Page DE object 202 invokes the objects responsible for paragraphs 420 and 422, image 462, and table 466, to render their respective elements and cause the page to be displayed. Accordingly, paragraph DE object 220 renders paragraph 420 based on paragraph layout data 620, paragraph DE object 222 lays out paragraph 422 based on paragraph layout data 622, image DE object 262 lays out image 462 based on image layout data 662, and table DE object 266 lays out table 466 based on table layout data 665. FIG. 6 shows an example web page 607 displaying paragraphs 420 and 422, image 462 and table 466, in accordance with an embodiment. Browser 210 also displays on page 607 a toolbar 615 which may display various available options and/or functions available to the user, such as a file function 617, and a scroll bar 692 that allows a user to scroll up or down within document 400.

In various embodiments, the method steps described herein, including the method steps described in FIG. 5, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
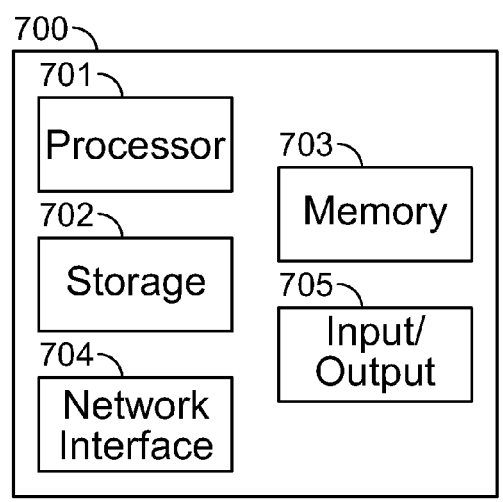
FIG. 7 shows components of a computer that may be used to implement the invention.

A high-level block diagram of an exemplary computer that may be used to implement systems, apparatus and methods described herein is illustrated in FIG. 7. Computer 700 includes a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the method steps of FIG. 5 can be defined by the computer program instructions stored in memory 703 and/or data storage device 702 and controlled by the processor 701 executing the computer program instructions. For example, the computer program instructions can be implemented as computer executable code programmed by one skilled in the art to perform an algorithm defined by the method steps of FIG. 5. Accordingly, by executing the computer program instructions, the processor 701 executes an algorithm defined by the method steps of FIG. 5. Computer 700 also includes one or more network interfaces 704 for communicating with other devices via a network. Computer 700 also includes one or more input/output devices 705 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may include one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each include a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, etc. For example, input/output devices 705 may include a display device such as a cathode ray tube (CRT) or liquid crystal display (LCD) monitor for displaying information to the user, a keyboard, and a pointing device such as a mouse or a trackball by which the user can provide input to computer 700.

Any or all of the systems and apparatus discussed herein, including online document processing service 130, user device 160, and components thereof, including web browser 210, display 270, client application 235, memory 260, document process 310, and document repository 325, may be implemented using a computer such as computer 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A method comprising:
maintaining, by a page object associated with a page of a document, a list indicating positions of respective positioned elements on the page;

transmitting, by the page object, to a first paragraph object associated with a first paragraph associated with the page, the first paragraph object being subordinate to the page object within a hierarchy, first position information generated based on the list, the first position information indicating a first position of a first positioned element having a position that conflicts with a location of the first paragraph, and invoking, by the page object, the first paragraph object to lay out the first paragraph based on the first position information, to generate first layout data, wherein the first paragraph object is a first programming class comprising a first function for determining whether the location of the first paragraph collides with a position of another positioned element;

updating, by the page object, the list based on update information received from the first paragraph object, the update information indicating a position of a second positioned element having a position that conflicts with a location of the first paragraph;

transmitting, by the page object, to a second paragraph object associated with a second paragraph associated with the page, the second paragraph object being different from the first paragraph object and subordinate to the page object within the hierarchy, second position information generated based on the updated list, the second position information comprising an indication of the position of the second positioned element, and invoking, by the page object, the second paragraph object to lay out the second paragraph based on the second position information, to generate second layout data; and displaying the page based on the first layout data and the second layout data.

2. The method of claim 1, wherein the first paragraph object comprises a first layout function for laying out the first paragraph and the second paragraph object comprises a second layout function for laying out the second paragraph.

3. The method of claim 1, wherein the first programming class further comprises a first set of properties that define and store the first paragraph and the second paragraph object is a second programming class that comprises a second set of properties that define and store the second paragraph.

4. The method of claim 1, wherein:
the first positioned element is one of an image and a table; and
the second positioned element is one of an image and a table.

5. The method of claim 1, wherein the first paragraph object lays out text of the first paragraph to fit around the first positioned element.

6. The method of claim 1, wherein the first programming class further comprises a second function for laying out the first paragraph and a third function for rendering the first paragraph.

7. A non-transitory computer readable medium having program instructions stored thereon, the instructions capable of execution by a processor and defining the steps of:
maintaining, by a page object associated with a page of a document, a list indicating positions of respective positioned elements on the page;
transmitting, by the page object, to a first paragraph object associated with a first paragraph associated with the page, the first paragraph object being subordinate to the page object within a hierarchy, first position information generated based on the list, the first position information indicating a first position of a first positioned element having a position that conflicts with a location of the first paragraph, and invoking, by the page object, the first paragraph object to lay out the first paragraph based on the first position information, to generate first layout data, wherein the first paragraph object is a first programming class comprising a first function for determining whether the location of the first paragraph collides with a position of another positioned element;
updating, by the page object, the list based on update information received from the first paragraph object, the update information indicating a position of a second positioned element having a position that conflicts with a location of the first paragraph;
transmitting, by the page object, to a second paragraph object associated with a second paragraph associated with the page, the second paragraph object being different from the first paragraph object and subordinate to the page object within the hierarchy, second position information generated based on the updated list, the second position information comprising an indication of the position of the second positioned element, and invoking, by the page object, the second paragraph object to lay out the second paragraph based on the second position information, to generate second layout data; and
displaying the page based on the first layout data and the second layout data.

8. The non-transitory computer readable medium of claim 7, wherein the first paragraph object comprises a first layout function for laying out the first paragraph and the second paragraph object comprises a second layout function for laying out the second paragraph.

9. The non-transitory computer readable medium of claim 7, wherein the first programming class further comprises a first set of properties that define and store the first paragraph and the second paragraph object is a second programming class that comprises a second set of properties that define and store the second paragraph.

10. The non-transitory computer readable medium of claim 7, wherein:
the first positioned element is one of an image and a table; and
the second positioned element is one of an image and a table.

11. The non-transitory computer readable medium of claim 7, wherein the first paragraph object lays out text of the first paragraph to fit around the first positioned element.

12. The non-transitory computer readable medium of claim 7, wherein the first programming class further comprises a second function for laying out the first paragraph and a third function for rendering the first paragraph.

13. A system comprising:
a processor; and
a memory coupled to the processor, the memory storing:
a page object associated with a page of a document;
a first paragraph object associated with a first paragraph associated with a page, the first paragraph object being configured to lay out the first paragraph, the first paragraph object being subordinate to the page object within a hierarchy; and
a second paragraph object associated with a second paragraph associated with the page, the second paragraph object being configured to lay out the second paragraph, the second paragraph object being subordinate to the page object within the hierarchy;
the page object being configured to:
maintain a list indicating positions of respective positioned elements on the page;
transmit to the first paragraph object first position information generated based on the list, the first position information indicating a first position of a first positioned element having a position that conflicts with a location of the first paragraph, and invoke the first paragraph object to lay out the first paragraph based on the first position information, to generate first layout data, wherein the first paragraph object is a first programming class comprising a first function for determining whether the location of the first paragraph collides with a position of another positioned element;

update the list based on update information received from the first paragraph object, the update information indicating a position of a second positioned element having a position that conflicts with a location of the first paragraph;

transmit to the second paragraph object second position information generated based on the updated list, the second position information comprising an indication of the position of the second positioned element, and invoke the second paragraph object to lay out the second paragraph based on the second position information, to generate second layout data; and display the page based on the first layout data and the second layout data.

14. The system of claim 13, wherein the first paragraph object comprises a first layout function for laying out the first paragraph and the second paragraph object comprises a second layout function for laying out the second paragraph.

15. The system of claim 13, wherein the first programming class further comprises a first set of properties configured to define and store the first paragraph and the second paragraph object is a second programming class that comprises a second set of properties configured to define and store the second paragraph.

16. The system of claim 13, wherein:
the first positioned element is one of an image and a table; and
the second positioned element is one of an image and a table.

17. The system of claim 13, wherein the first paragraph object lays out text of the first paragraph to fit around the first positioned element.

18. The system of claim 13, wherein the first programming class further comprises a second function for laying out the first paragraph and a third function for rendering the first paragraph.

* * * * *